No. 881,831. PATENTED MAR. 10, 1908.
R. B. SMITH.
SOUND REPRODUCER.
APPLICATION FILED SEPT. 17, 1907.

WITNESSES
Geo. W. Naylor
Walton Harrison

INVENTOR
Richard B. Smith
BY Munn & Co
ATTORNEYS

UNITED STATES PATENT OFFICE.

RICHARD BARTHOLOMEW SMITH, OF NEW YORK, N. Y.

SOUND-REPRODUCER.

No. 881,831.

Specification of Letters Patent.

Patented March 10, 1908.

Application filed September 17, 1907. Serial No. 393,309.

*To all whom it may concern:*

Be it known that I, RICHARD BARTHOLOMEW SMITH, a subject of the King of Great Britain, and a resident of the city of New York, borough of Manhattan, in the county and State of New York, have invented a new and Improved Sound-Reproducer, of which the following is a full, clear, and exact description.

My invention relates to reproducers, such, for instance, as are employed in connection with talking machines, my more particular object being to provide for greater freedom of movement of the stylus lever in order to permit a more faithful reproduction of the vibrations and to avoid undue wear upon the record and stylus.

More particularly stated, my invention relates to means for permitting the stylus lever to travel freely in a direction lateral to the general direction of travel of the diaphragm.

Reference is to be had to the accompanying drawings forming a part of this specification, in which similar characters of reference indicate corresponding parts in all the figures.

Figure 1:
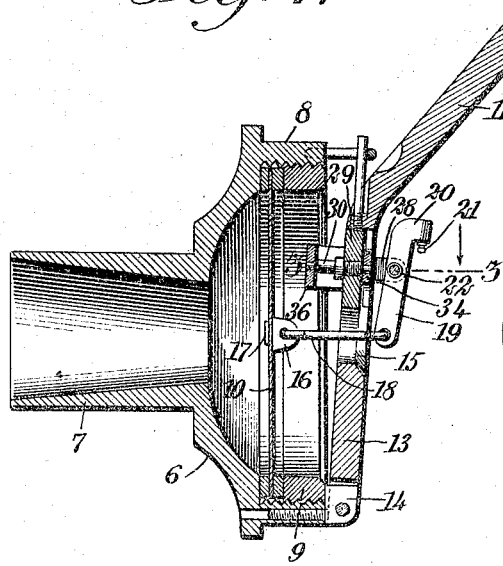
Figure 2:
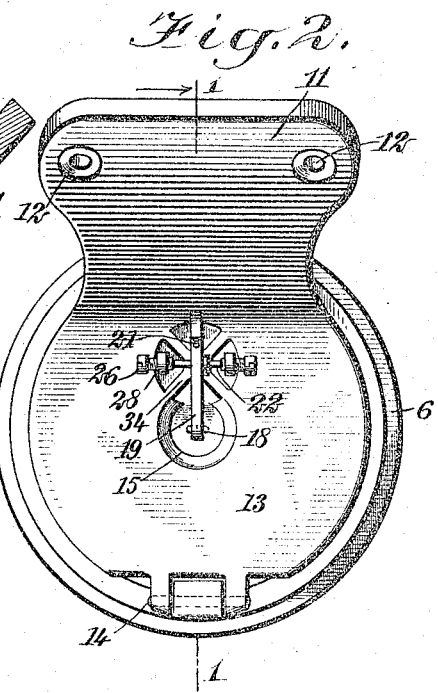
Figure 3:
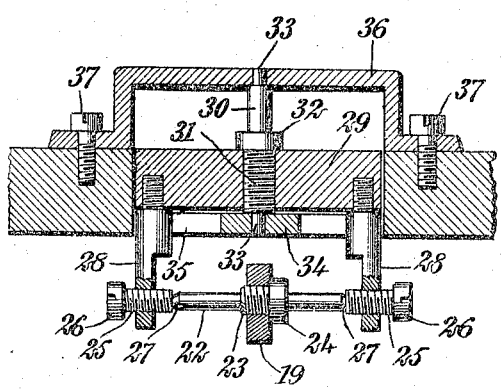
Figure 4:
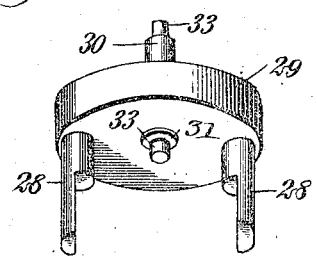
Figure 5:
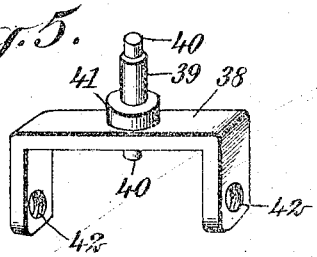

Figure 1 is a central vertical section on the line 1—1 of Fig. 2, through a reproducer of the so-called "Edison type," equipped with my invention, this view showing the diaphragm, the stylus lever for actuating the same, and the means employed for allowing the stylus lever to turn or rock in a direction approximately parallel to the diaphragm; Fig. 2 is a rear elevation of the reproducer, showing how the stylus lever is mounted upon the rocking disk by aid of a staff pivotally mounted upon the rocking disk; Fig. 3 is an enlarged central section on the line 3—3 of Fig. 1, through the rocking disk, showing more particularly how the staff is supported thereupon and how the stylus lever is connected with the staff; Fig. 4 is a perspective showing one form of swivel carrier for supporting the stylus lever; Fig. 5 is a perspective showing a different form of swivel carrier for supporting the stylus lever.

The reproducer casing is shown at 6 and is provided with a sleeve 7 to which the phonograph horn may be connected. The casing is provided with an annular portion 8 threaded internally and mounted within it is a ring 9 threaded externally. A diaphragm 10 is mounted within the casing 6 and is free to vibrate. A weight 11, having the form of a plate, is provided with the usual holes 12 whereby it may be partially supported, if desired, by aid of a ribbon or string, when the apparatus is not in use. A plate 13, integral with this weight 11 and forming a continuation thereof, is connected with the casing 6 at the bottom thereof by aid of a hinge 14, and the plate 13 is provided centrally with an aperture 15. Mounted upon the diaphragm 10 is a cross head 16 which is engaged by a connecting link 18, and the latter extends through the aperture 15 and engages the lower end of a stylus lever 19. The upper end of this stylus lever is provided with a lug 20 which supports a jewel or glass stylus 21 for engaging the record cylinder. A staff 22 supports the stylus lever 19, and for this purpose a cylindrical screw 23 is fitted tightly upon the staff 22, being preferably shrunken thereto so as to avoid the possibility of its becoming detached. This cylindrical screw is provided with an annular head 24 which jams squarely against the stylus lever 19. The screw extends directly through the body of said lever.

The staff 22 is supported by screws 25, the inner ends of which are cupped for the purpose. These screws are provided with heads 26 whereby they may be turned, and are so arranged that the cups upon the inner ends of the screws fit upon the ends of the staff 22 which are made conical at 27 for this purpose. By turning the screws 26 the play of the staff 22 may be regulated at will and the general position occupied by the stylus lever 19, relatively to the center of the diaphragm, may be controlled as desired.

Supporting the screws 25 are two stems 28 each screwed into a rocking disk 29. This rocking disk is mounted upon a stub shaft 30, the latter being provided with a threaded cylindrical portion 21 extending directly through the rocking disk. Mounted upon the stub shaft 30 is an enlarged portion 32 constituting a head for the threaded portion 31. The stub shaft 30 is provided at its ends with reduced bearing portions 33. One of these reduced bearing portions extends through a spider 34 integral with the plate 13. This spider is formed by cutting away the plate 34 so as to leave arcuate slots 35.

A bridge 36 is mounted upon the plate 13 and secured thereto by aid of screws 37. This bridge engages one of the reduced portions 33 of the stub shaft 30 and forms a bearing therefor. The bridge 36 and the spider 34 being rigid relatively to each other, and the rocking disk 29 being normally rigid in relation to the stub shaft 30, it follows that the rocking disk 29 turns upon the reduced bearing portions 33 which are supported by the bridge 36 and spider 34.

The arrangement above described allows great freedom of movement of the stylus lever 19, this lever being free to turn in practically any direction occasionally required, and being especially free to turn in a direction corresponding to a plane lateral to the general direction of vibration of the diaphragm 10.

In the form shown in Fig. 5, the U-shaped bracket 38 takes the place of the rocking disk 29. A stub shaft 39 is provided with reduced ends 40 and with an enlarged annular portion 41, the latter engaging directly the surface of the U-shaped bracket. Threaded holes 42 are provided in the U-shaped bracket for accommodating the screws 25, as will be understood by contrasting Fig. 5 with Fig. 3.

One purpose in increasing the greater freedom of movement allowed to the stylus lever, is to enable the vibratory impulses to be faithfully transmitted to the diaphragm in order that the diaphragm may in turn faithfully reproduce said impulses. Another purpose is to allow the stylus to follow irregularities in the record surface, without the possibility of mutilating either the stylus or the record surface, and also without permitting such irregularities to reproduce a false sound. The mounting above described for the stylus lever 19 is practically that of a universal joint or of a swivel.

It will be noted that the pivotal mounting for the stylus lever 19 is disposed in a line which, at one point, coincides with the axial line upon which the disk 29 turns. Such being the case the rocking of the disk 29 and of the stylus lever 19 does not change the position of the imaginary line around which the stylus lever 19 turns as a center when it rocks in a plane substantially parallel with the general plane occupied by the plate 13 so that this line always coincides with the imaginary line upon which the disk rocks as a center.

Having thus described my invention, I claim as new and desire to secure by Letters Patent:

1. The combination of a member mounted free to rock upon an axis, and a stylus lever supported upon said member and free to rock upon an axis intersected by a prolongation of the axis of said member, and a diaphragm in operative relation to said stylus lever.

2. The combination of a member mounted free to rock upon an axis, and a longitudinal stylus lever pivoted upon said member and free to rock, said lever extending diametrically across the axis of said member, and a diaphragm in operative relation to said stylus lever.

3. The combination of a casing, a vibratory diaphragm mounted therein, a weight disposed adjacent to said casing and movable relatively thereto, a rocking member mounted upon said weight and free to turn relatively to the same in a plane nearly parallel with the plane of said diaphragm, and a stylus lever free to rock in a general direction crossing the plane of said diaphragm, the axis of said stylus lever being intersected by a prolongation of the axis of said rocking member.

4. The combination of a vibratory diaphragm, means for supporting the same, a weight disposed adjacent to said diaphragm and free to move independently thereof, a disk mounted upon said weight and free to turn relatively thereto in a plane nearly parallel with the plane of said diaphragm, and a stylus lever journaled upon said disk and free to rock in a general direction crossing the plane of said diaphragm, the axis of said stylus lever being intersected by a prolongation of the axis of said disk.

5. The combination of a supporting member mounted to rock upon an axis, a stylus lever mounted upon said supporting member and free to rock upon an axis, said lever being so positioned that the axis is intersected by a prolongation of the axis of said supporting member, a vibratory diaphragm, and a connection from said vibratory diaphragm to said stylus lever.

6. The combination of a vibratory diaphragm, means for supporting the same, a weight having substantially the form of a flat plate disposed adjacent to said diaphragm and pivotally mounted, said plate being provided with a recess, a rocking disk mounted within said recess and adapted to move in a plane parallel with said plate, the center of said rocking disk being disposed above the center of said diaphragm, a stylus lever journaled upon said rocking disk and adapted to rock in a plane crossing the general plane occupied by said rocking disk, the axis of said stylus lever being intersected by a prolongation of the axis of said rocking disk, and a connection from said stylus lever to said diaphragm.

In testimony whereof I have signed my name to this specification in the presence of two subscribing witnesses.

RICHARD BARTHOLOMEW SMITH.

Witnesses:
WALTON HARRISON,
EVERARD B. MARSHALL.